Figure 1:
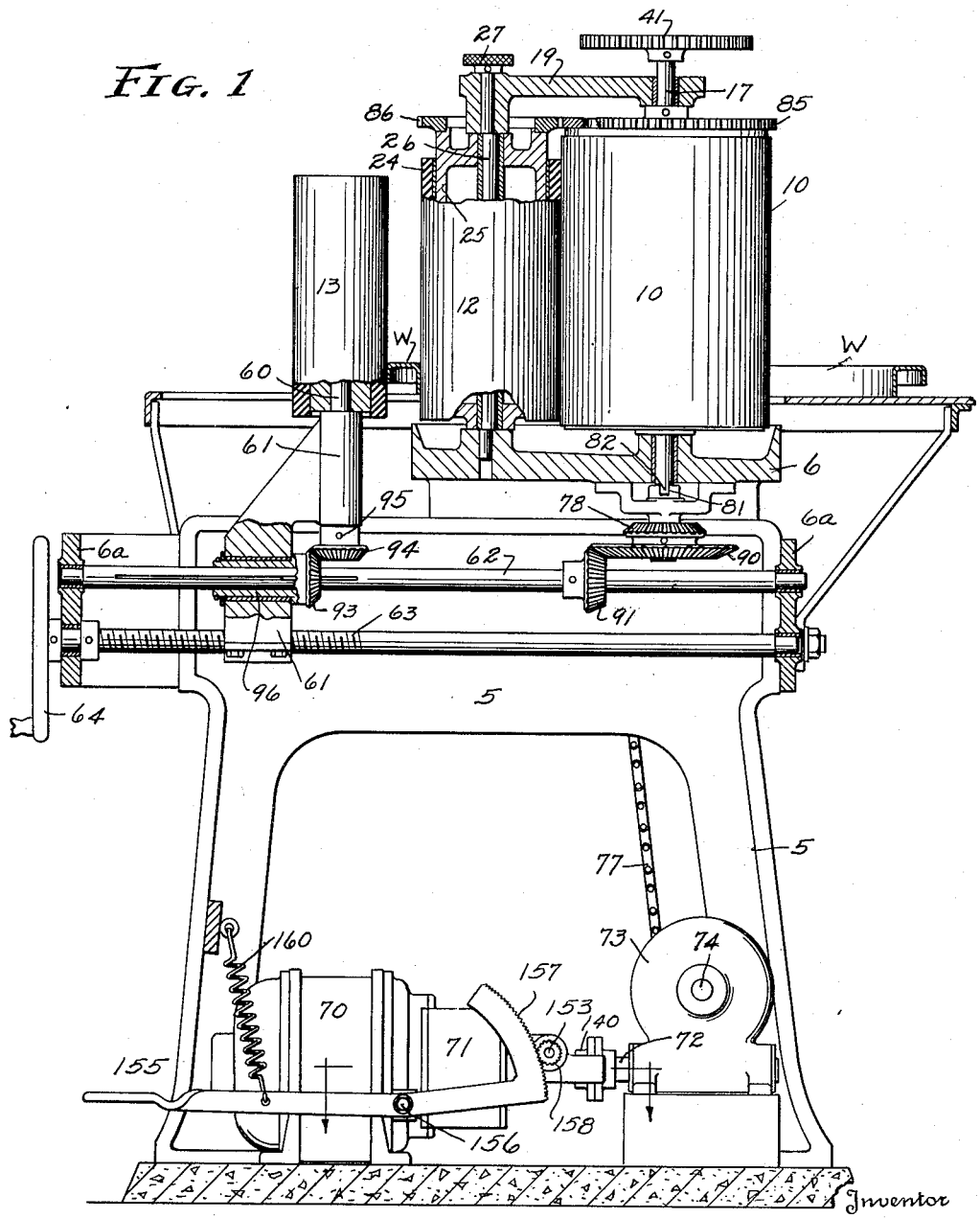

Dec. 10, 1935.    L. V. CASTO    2,023,463
METHOD AND APPARATUS FOR DECORATING SURFACES
Filed June 14, 1934    4 Sheets-Sheet 1

Inventor
Lloyd V. Casto
By Bates, Golrick & Teare
Attorneys

Dec. 10, 1935.   L. V. CASTO   2,023,463
METHOD AND APPARATUS FOR DECORATING SURFACES
Filed June 14, 1934   4 Sheets-Sheet 2

Inventor
Lloyd V. Casto
By Bates, Golrick & Teare
Attorneys

Dec. 10, 1935.  L. V. CASTO  2,023,463
METHOD AND APPARATUS FOR DECORATING SURFACES
Filed June 14, 1934  4 Sheets-Sheet 3

Inventor
Lloyd V. Casto
By Bates, Golrick & Teare
Attorneys

Dec. 10, 1935. L. V. CASTO 2,023,463
METHOD AND APPARATUS FOR DECORATING SURFACES
Filed June 14, 1934 4 Sheets-Sheet 4

Inventor
Lloyd V. Casto
By Bates, Goldrick & Teare
Attorneys

Patented Dec. 10, 1935

2,023,463

UNITED STATES PATENT OFFICE 2,023,463

METHOD AND APPARATUS FOR DECORATING SURFACES

Lloyd V. Casto, Detroit, Mich.

Application June 14, 1934, Serial No. 730,640

13 Claims. (Cl. 101—36)

This invention relates to a method and apparatus for decorating objects, and especially for decorating objects which have straight and curvilinear surfaces. This, therefore, is the general object of the invention.

Many articles to be decorated, as, for instance, frames and boxes, have edge surfaces, both inner and outer, which comprise intersecting surfaces, connected by curved corner surfaces. In the past, the decorating of such surfaces with wood grains and other patterns has presented difficult problems. Mechanisms have been devised for this purpose, an example being shown in Letters Patent No. 1,900,030, issued to my assignee, March 11, 1933. Such special mechanisms have, to a certain extent, permitted the decoration of frames and boxes. They, nevertheless, have not overcome entirely the problems presented. These mechanisms have afforded the decorating of the straight surfaces with a very high degree of success. However, the decoration of the curvilinear connecting surfaces, while improved over preceding mechanisms, effected by such mechanisms and methods, did not attain the high degree of success that was reached in the decoration of the straight surfaces. The images of the designs on the curvilinear surfaces were less distinct, and the tonal variations were less accurate than those which were reproduced on the straight surfaces. These disadvantages, while present in the decoration of outside surfaces, were more apparent in the decoration of the inner surfaces. This was especially true in the case of window frames, for instance, those used in automotive bodies, wherein the inner surfaces are the most noticeable surface when the decorated article is in use.

An object of the present invention, therefore, is to provide a method and apparatus for decorating the edges of objects, such as frames, boxes and the like, which method and apparatus will provide substantially the same high degree of sharpness of image and tonal reproduction for the interconnecting curvilinear surfaces of the corners of such objects, as is attained on the comparatively straight sides of the object.

A more specific object of this invention is to decorate articles having surfaces of different degrees of curvature, by using a printing member or roll carrying the design to be transferred to the object in color thereon, and passing such roll over the surfaces of least curvature at one rate of speed, and over the surfaces of greater curvature at another rate.

Other advantages of my improved method and apparatus, together with other objects of my invention, will become more apparent from the following description, reference being had to the drawings, which illustrate a preferred form of apparatus for readily carrying out my improved method. The essential features of the invention will be summarized in the claims.

Figures 2, 7:
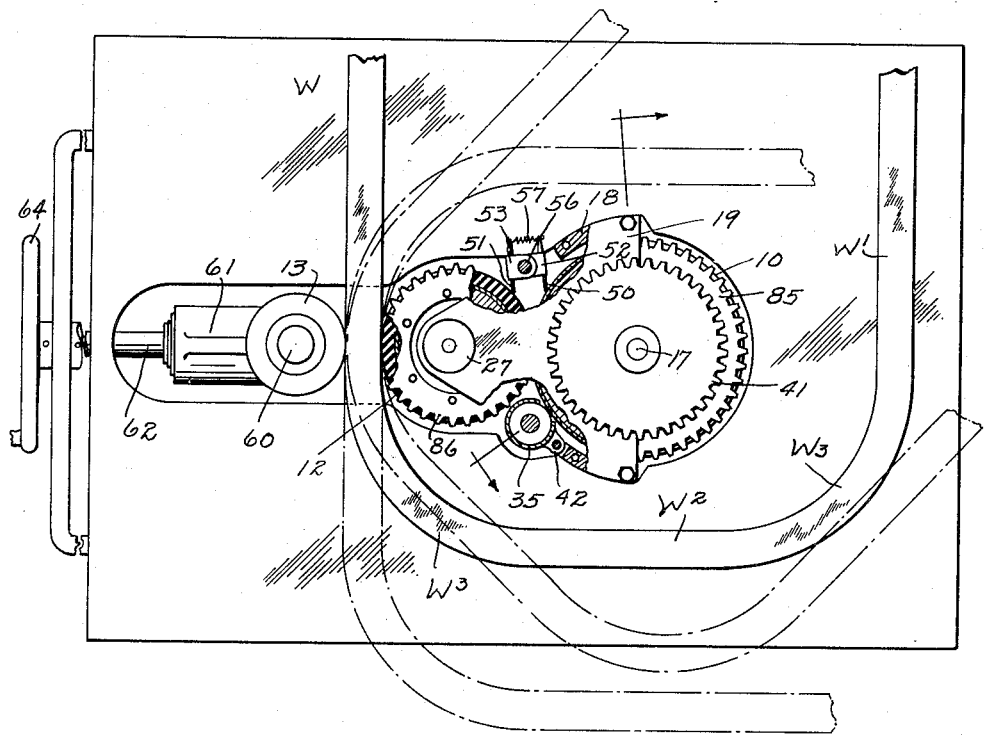
Figure 4:
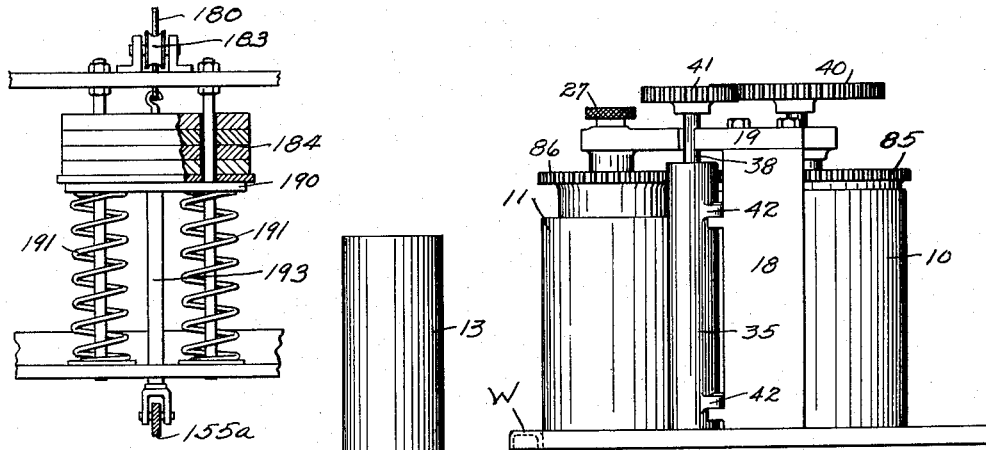
Figure 3:
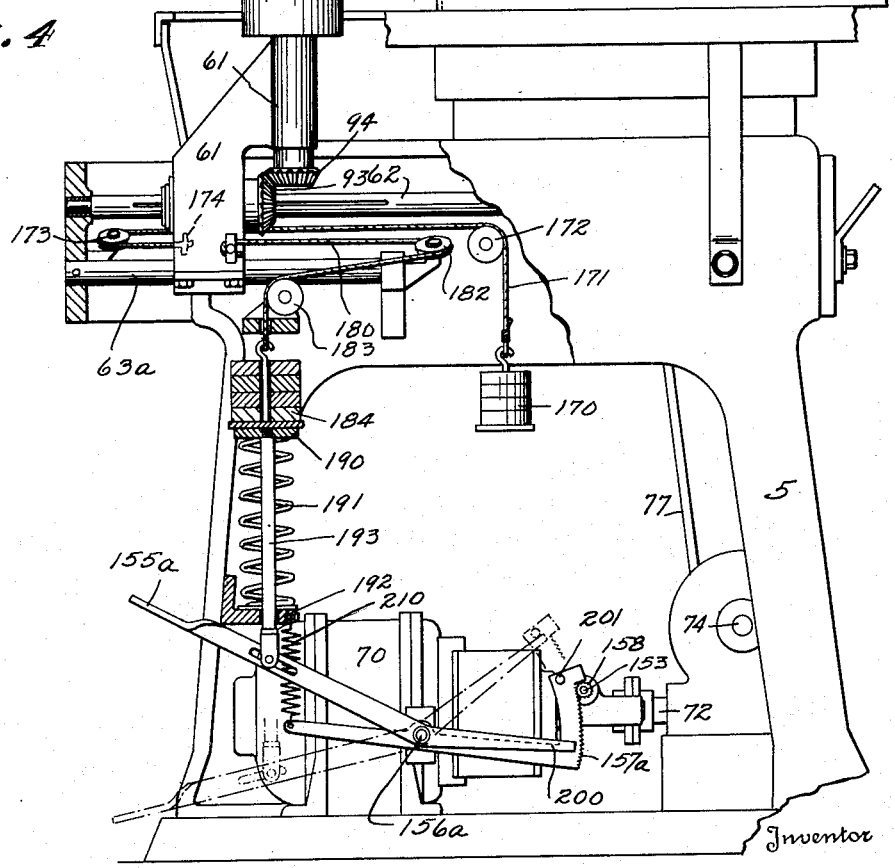
Figure 6:
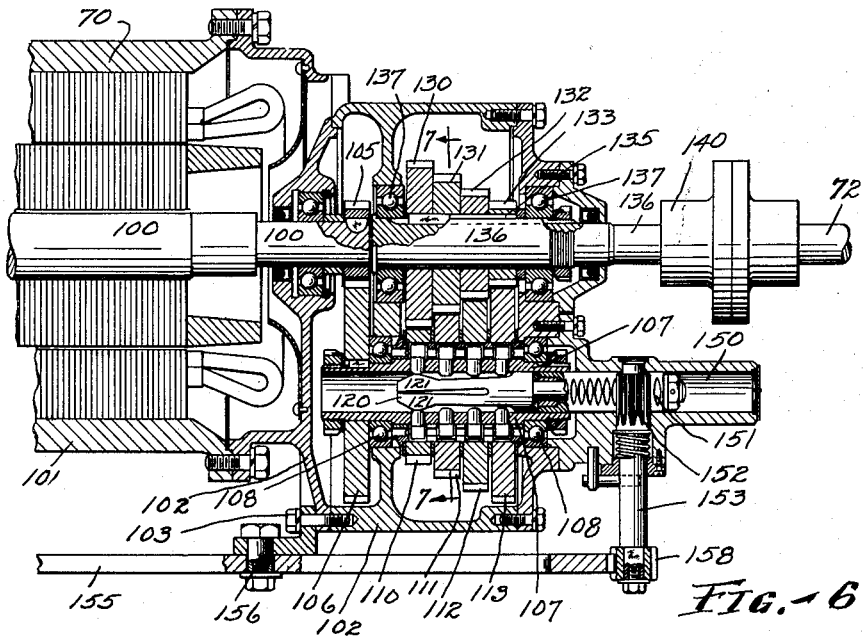
Figure 5:
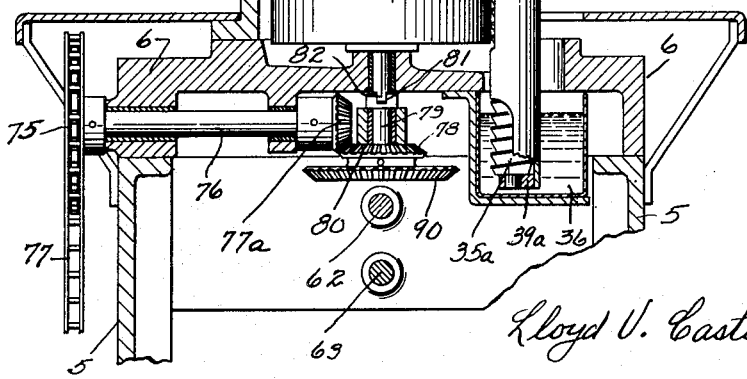

Referring now to the drawings, Fig. 1 illustrates a side elevation of a form of improved mechanism which may be used for carrying out my improved method. Fig. 2 is a plan of the apparatus, illustrated in Fig. 1; Fig. 3 is a side elevation of a modified form of apparatus; Fig. 4 is a detailed section, as indicated by the line 4—4 on Fig. 3; Fig. 5 is a detailed section, as indicated by the lines 5—5 on Figs. 1 and 3; Fig. 6 is a sectional detail of a preferred form of driving unit, as indicated by the lines 6—6 on either Figs. 1 or 2; Fig. 7 is a sectional detail through the driving unit, as indicated by the lines 7—7 on Fig. 6.

Frames or boxes of the type for which my improved method and apparatus for decorating are especially adaptable, are indicated at W, Figs. 1, 2 and 3, and generally includes straight or comparatively straight planular surfaces W2, which are joined by curvilinear surfaces, W3, all of which surfaces are preferably grained in one operation to avoid overlapping of the pattern and other similar disadvantages. The pattern may be reproduced readily by the well-known photomechanical method, and formed on a suitable pattern plate. The color or pigment is then applied to such pattern and the excess color removed. A suitable offset or transfer roll is then brought into engagement with the inked pattern, and the color or pigment carried by such pattern is transferred to the offset roll in the usual manner. The offset roll is then brought into engagement with the surface to be decorated and rolled thereacross at a predetermined rate of speed. When the junction of a straight surface with a curvilinear surface, or the junction of a surface of one degree of curvature with a surface having a different degree of curvature, is reached, the transfer roll is rolled across such last-mentioned surfaces at a different rate of speed, such change of speed being accomplished while maintaining constant contact between the offset roll and the work, and preferably without any appreciable stopping of the rolling action between the transfer roll and the work.

Referring again to the drawings, and especially Figs. 1 and 2, I have illustrated a mechanism for carrying out my improved method. Such machine is a vertical graining machine and is well adapted for gaining of surfaces disposed vertically or nearly so. The primary elements of the machine comprise a pattern roll 10, a transfer roll 12, and a pressure roll or platen roll 13, for carrying the work to be grained or otherwise decorated into printing contact with the transfer roll. It is not essential, however, that there be a separate pattern element as shown, inasmuch as the pattern transfer roll 12 may have the design formed thereon. The pattern element may likewise be embodied in shapes other than cylindrical rolls.

The various printing rolls above mentioned are supported on a main machine frame, comprising, as shown, a base plate 6 supported by suitable standards 5. The pattern roll 10 which, as shown, comprises a cylinder having a central shaft 17, may have any suitable pattern thereon, for example, an intaglio pattern of wood grain design may be etched on the outer surface in any suitable way. The shaft 17 extends downwardly through a boss formation on the base plate 6 at one end and extends upwardly through an overhanging cross bar 19 which is supported above the base 6 by a suitable vertical post member 18. The lower end of the shaft 17 has associated therewith a driving mechanism for driving the pattern roll, which will be hereinafter described.

The transfer roll 12 comprises a suitable cylinder of resilient ink-receptive material, such as a composition of glue and glycerine, and is mounted on a suitable core 25, having a centrally located or axially aligned supporting shaft 26, journalled at its opposite ends in the base frame member 6 and the overhanging bracket 19, respectively. The journalled ends of the shaft 26 are eccentric to the main body of the shaft, so that the pressure between the offset roll 12 and the pattern roll 10 may readily be adjusted by rotating the eccentric by means of a suitable knob 27 supported at the upper end of the shaft.

Pigment is applied to the pattern roll in any suitable manner. However, it is preferable to employ the device shown in Fig. 5. Such device comprises a screw type pump, there being a pump casing 35 in a vertical position with its lower end 35a extending in a tank or reservoir 36 carried by the frame member 6. Rotatable within the pump casing is a screw 38, which carried by a suitable shaft extending upwardly out of the top of the casing through a bearing 39, and extending downwardly through a bearing 39a in the bottom of the casing. The shaft is driven through the medium of a spur gear 40 drivingly secured to the shaft and meshing with a spur gear 41 of larger diameter, carried on the upper end of the pattern roll shaft 17. The side of the pump casing 35 immediately adjacent the pattern roll is provided with an elongated opening 37, extending substantially the entire length of the pattern roll. Hence, when the pattern roll is driven, the screw will lift the pigment out of the reservoir and spread it on the adjacent pattern roll surface in a uniform manner. The pump casing 35 is provided with a suitable lug or bracket formation 42, which engages the upstanding post support 18, heretofore mentioned, and an adjustment for maintaining the proper space between the discharge opening in the pump casing and the pattern may be provided in the form of an adjusting screw (not shown).

The excess pigment applied to the pattern roll by the inking device is removed by a suitable scraper or doctor blade. Likewise, any pigment remaining on the transfer roll 2, after the latter has transferred the pattern to the work, is also removed by a similar scraper. Such scrapers are shown in Fig. 2 at 50 and 51, respectively. The scrapers are mounted on suitable swinging supports 52 and 53, which are pivoted to an upright rigid bar 56. A suitable spring 57, acting between the ends of the scraper plate farthest away from their respective rolls, acts to rock the scrapers about the bar 56 into contact with the pattern roll and the offset roll, respectively.

The platen or pressure roll 13 is supported for movement toward and away from the offset roll 12, in order that different widths or thicknesses of work may be accomplished readily, and in order that the desired pressure between the work and the offset roll may be obtained. As shown in Fig. 1, the platen or pressure roll 13 is rotatably carried on a vertically extending shaft 60, which is rotatably supported in a bracket member 61, which is slidably mounted on a horizontally extending shaft 62 mounted in suitable bearings in transverse frame members 7, which interconnect the frame members 5. The bracket 61 is retained in an upright position by a shaft 63, parallel with the shaft 62 and threadingly engaging the lower end of the bracket 61. The adjustment of the platen roll 13 toward and away from the offset roll 12 is readily accomplished by rotating the threaded shaft 63 by means of a suitable hand wheel 64, thus moving the bracket members 61, together with the platen roll 13, along the supporting shaft 62.

The driving mechanism, as shown, comprises a suitable motor 70, which, through a speed changing device 71, hereinafter more fully described, is connected with a shaft 72 of a gear reduction unit 73. The driven shaft 74 of the gear reduction unit is drivingly connected by a suitable driving chain 77 with a gear 75, carried by a drive shaft 76 mounted in the frame member 6. The sprocket 75 is drivingly mounted by the shaft 76, which, on its innermost end, is provided with a bevel pinion 77, meshing with a bevelled gear 78, carried by a vertically extending shaft 79. The shaft 79 is mounted in a frame member 80, and is provided, at its upper end, with a slot 81 arranged to engage a tongue 82 projecting downwardly from the lowermost end of the pattern roll shaft 17, thereby driving such shaft.

The offset roll 12 is driven through the medium of the pattern roll 10. As shown, a suitable gear ring 85 is drivingly secured to the pattern roll 10 adjacent its upper end and is arranged to mesh with a similar gear ring 86 which is secured to the upper end of the offset roll 12.

The platen roll 13 is likewise preferably driven. As shown, the driving gear 78, heretofore mentioned, carries integral with it a bevelled gear 79, which drivingly meshes with a pinion 91, rigidly secured to the supporting shaft 62 which supports the platen roll bracket 61. A suitable bevel gear 93 which is arranged in splined engagement with the shaft 62 meshes with the gear 94 secured to the shaft 60 by a pin 95. The gear 93 preferably is provided with an elongated hub portion 96, which is slidingly splined to the shaft 62, and around which is journalled the bracket member 61, thereby permitting the platen shaft 61 and the gearing 93 and 94 to be moved axially along the shaft 22 as a unit with the bracket as the latter is moved to vary the distance of pressure between the rolls 12 and 13, and without disturbing the driving connection between the shaft 62 and the platen or pressure roll 61.

The speed changing device 71, heretofore mentioned, is preferably integral with the frame of the motor 70, and is so arranged as to be under control of the operator at all times, in order that the operator may operate such speed changing device to increase or decrease the speed, as desired, when the offset roll approaches the junction between a straight surface and a curvilinear surface.

The speed changing device is best illustrated in Figs. 1 and 6. Referring to the latter figure, it will be noted the armature shaft 100 of the motor 10 extends through the motor housing 101 and into a supplemental housing 102, which is secured to the motor housing by suitable bolts indicated at 103. The armature shaft 100 of the motor has secured to its outermost end a spur gear 105 meshing with a gear 106, rigidly secured to a hollow driving shaft 107 which is rotatably journalled in suitable bearings 116 in the frame member 102. Rotatably mounted on the hollow shaft 107 are gears 110, 111, 112 and 113. Each of these gears comprise, as shown in Fig. 7, a gear ring 115, the inner periphery 116 of which is arranged to be engaged by a pair of clutch shoes 117.

The clutch shoes 117 are operated or expanded into contact with its respective gear ring by upstanding wedges 118. The wedges 118 are slidably mounted in suitable radially extending openings in the walls of the hollow shaft 107, and extend between the end of the clutch shoes 117, thereby serving as a driving connection between the hollow shaft 107 and the clutch shoes. Within the shaft 107 is a spring member 120, which is slidable axially of the shaft, at the will of the operator, as will hereinafter be described. Adjacent the left-hand end, the spring has a protuberance 121, which is arranged to be selectively moved to engagement with the expanding wedges 118 of the various gears 110 to 115, to cause their clutch members 117 to be expanded, and thereby brought into driving engagement with the respective gear member. As shown in Fig. 6, the spring 120 is in position to extend the expanding wedges 118 of the gear member 110, thereby wedging the driving shoe 117 of that gear member into engagement with the internal periphery of the gear member, causing the gear to be driven.

Each of the gears 110, 111, 112 and 113 are in constant mesh with respective companion gears 130, 131, 132 and 133. The arrangement of the various pairs of gears being such that four distinct ratios of speed may be had. The gears 130 to 133 inclusive are drivingly secured by means of a key 135 to a shaft 136, rotatably mounted in suitable bearings 137 in the casing member 102. The shaft 136 extends some distance beyond the outermost end of the casing and is provided with a coupling member 140, arranged to couple the shaft 136 of the speed changing device, with the shaft 72 of the speed reduction unit 73, heretofore mentioned.

The spring member which operates to selectively cause the gears 110, 111, 112 and 113 to be clutched to the driven hollow shaft member 107 of the speed changing device, extends outwardly into a hollow boss like portion of the casing 102, and is provided with a rack portion 151 arranged to be engaged by a pinion 152 carried on an operating gear 153, which is constantly under control of the operator.

As shown in Figs. 1 and 6, the operating shaft 153 of the speed changing device is under control of the operator of the machine. An operating pedal 155 is pivotally connected to the motor housing, as at 156, and carries on its outermost end a fixed segmental arcuate rack or gear member 157, arranged to mesh with a spur gear 158 on the outermost end of the control shaft 153. Suitable tension springs 160 interposed between the pedal 155 and a frame member act to normally retain the pedal in position to cause the speed changing device to be in a neutral position, that is, with the protuberance 121 of the spring expanding device, interposed between the expanding wedges of adjacent gears. When it is desired to set the machine in operation, the operator partially depresses the foot pedal to cause the expander to be moved axially to a position to cause one of the sets of gears to be drivingly connected with the shaft 107 and with the shaft 140. As the platen roll approaches a point where the offset roll is to pass from the plate surface to a curved surface, the operator further depresses the foot pedal 155, causing another set of gears to come into play, thereby changing the rate of speed at which the driven shaft 140 is operated, and consequently changing the rate of speed of rotation of the various rolls of the printing mechanism. Where the change is made due to the passing of the rolls from a straight surface to a curved surface, the operator depresses the pedal 155 to cause the driving speed of the rolls to be decreased, and vice versa when passing from a curvilinear surface to a straight surface. While I have used the terms "straight surface" and "curvilinear surface", it is to be understood that corresponding changes in speed are made when passing from one curvilinear surface to another surface of greater curvature.

In Figs. 3 and 4 I have illustrated a modified form of controlling apparatus, in which the hand wheel 64 which operates to move the platen roll 13 into and out of engagement with the work, has been eliminated, and a controlling mechanism has been associated with the foot pedal 155a, so that the operation of the foot pedal serves to move the platen roll 13 to and from its work retaining position, as well as to operate the speed-changing devices. In this construction, parts similar to those already described, are given the same reference numerals.

As shown, in Fig. 3, the platen roll is supported as heretofore described. The bracket 61 which is slidably mounted on the shaft 62, and is retained from rotating about such shaft by a shaft 63a, which slidably embraces the lower portion of the bracket. A series of weights is provided to move the bracket 61 together with the pressure roller toward and away from the work W. As shown in Fig. 3, a suitable weight 170 is suspended on one end of a flexible cable 171 which passes around pulleys 172 and 173 and is secured as at 174 to the left-hand end of the bracket 61. Hence, this weight tends at all times to draw the bracket 61, together with the platen roll 13, out of engagement with the work W. Another similar flexible cable 180 is secured to the forward end of the bracket 61, and passes around suitable pulleys 182 and 183, and carries on its lower end weights 184. The arrangement of the latter cable is such that the weight 184 tends to move the roll 13 and the bracket 61 towards the work W.

When a control lever 135a which is pivoted to the motor frame at 156a operates to relieve the cable 180 of the weights 184, thereby being in its normal or uppermost position, a block or table 190 is brought into supporting engagement with the lower end of the weight 184 by a suitable compression spring 191, which is interposed between the table 190 and a suitable frame bracket 192, thereby relieving the cable 180 of the weight 184 and permitting the weight 170 to act on the bracket 61 and draw the pressure roller 13 away from the work W. When, however, the lever 155a is depressed by the operator, a link member 193, which is connected between the lever and the supporting table 190, withdraws the supporting table, permitting the weight 184, which is heavier than the weight 170, to be released, thereby drawing the roll 13 into contact with the work W. After the lever 155a has been depressed an amount sufficient to cause the roll 13 to contact with the work, the lever 200 coacts with a pin 201 carried by a segmental gear member 157a which is pivotally mounted as at 156a to the motor frame. The gear member 157a coacts with the spur gear 158 of the control shaft as heretofore mentioned. A suitable spring 210 normally acts to maintain the segmental gear member 157a in its normal or neutral position, in which position the speed change device is neutral, permitting the operation of the motor 70 without operation of the various printing rolls.

The pressure of the pressure roller against the work is readily controlled by adding to, or subtracting from the weights 170 and 184, as required. The pressure of the springs 191 is such that they will support the maximum weight of the member 184, as well as maintain the lever 155a in its uppermost position.

From the above description, it is seen that I have provided an improved graining apparatus which is well adapted to carry out my improved method of progressing the work through the printing rolls at one rate of speed for a straight surface, or surface of comparatively low curvature, and at another rate of speed for a surface of greater curvature and I have so arranged the controls that the mechanism may be operated by a single foot pedal which is used to withdraw the pressure roll from the work, as well as to change the speed of travel of the work through the bight of the printing rolls, thereby leaving the operator's hands free to handle the work pieces, thereby at one time producing a more distinct reproduction, better tonal qualities of the design, and economy and convenience of operation.

I claim:

1. A method of surface decorating objects having straight and curved surfaces, comprising passing the object between a printing roll and a pressure roll and varying the rate of movement of the object as it is being printed, whereby the straight surfaces of the object are printed at one speed and the curved surfaces of the object are printed at a different speed.

2. A method of surface decorating objects having straight and curved surfaces following each other, comprising passing the object between a printing roll having a continuous design in color thereon and a platen roll and varying the rate of movement of the object as it is being printed, whereby the straight surfaces of the object are printed at one rate of speed and the curved surfaces of the object are printed at a lower rate of speed, while maintaing contact between the printing roll and the work, thereby effecting a continuous pattern or design extending over both the straight and curved surfaces of the object.

3. A method of surface decorating objects having straight surfaces followed by curved surfaces relative to the progress of the decorating operation, comprising passing the object between a transfer printing roll and a pressure roll, said printing roll contacting first with the straight surface and subsequently with the curved surface, and varying the rate of rotation of the printing roll as the object is being printed, whereby the said rolls are rotated at one rate of speed while in contact with the straight surfaces of the object and are rotated at a slower rate of speed while in contact with the curved surfaces of the object, thereby effecting a continuous pattern or design extending over both the straight and curved surfaces of the object.

4. A method of decorating the surface of objects having surfaces of different degrees of curvature, such surfaces being contiguous and following each other, comprising passing the object between a printing roll and a pressure roll, progressing the work in rolling contact with such rolls at one rate of speed of movement of the work, while one of said surfaces is being printed, and progressing the work in rolling contact with such rolls at another rate of speed for another surface of a different degree of curvature, while effecting a continuous pattern or design extending uninterruptedly over both of said curved surfaces.

5. An apparatus of the class described, including a printing roll and a pressure roll to retain work in contact with the printing roll, said pressure roll being mounted for movement toward and away from said printing roll, means acting to move said pressure roll toward said printing roll, means acting to move said pressure roll away from said printing roll, one of said last-named means being of sufficient force to overcome the other, and mechanism to render such means inactive.

6. A decorating mechanism of the class described, including a printing roll and a pressure roll, adapted to retain work in contact with the printing roll, said pressure roll being mounted for movement toward and away from said printing roll, means to move the pressure roll toward the printing roll, means to move the pressure roll away from the printing roll, a motor, a driving connection between the motor and one of said rolls to rotate the rolls, a clutch interposed in said driving connection, an operating member for said clutch, and means interconnecting one of said pressure roll moving means to render the same operable or inoperable dependent upon the position of said clutch.

7. A decorating mechanism of the class described, including a printing roll, a pressure roll arranged to retain work in contact with the printing roll, means to move the pressure roll into and out of contact with the work, a motor, a driving connection between the motor and one of said rolls, said driving connection including a clutch, a manually operable member to selectively control the clutch, and a connection between said member and said moving means whereby the position of the pressure roll is determined by the position of the clutch control member.

8. A decorating mechanism of the class described, including a printing roll, a pressure roll mounted for movement toward and away from the printing roll, a weight connected to move the pressure roll toward the printing roll, a second weight connected to move the pressure roll away from the printing roll, the first-named weight acting with greater force than the last-named weight whereby when the two weights act together, the pressure roll is moved towards the printing roll, means normally acting to restrain the action of the first-named weight, whereby the pressure roll is normally moved away from the printing roll.

9. An apparatus of the class described, including a printing roll and a pressure roll to retain work in contact with the printing roll, said pressure roll being mounted for movement toward and away from said printing roll, means acting to move said pressure roll toward said printing roll, means acting to move said pressure roll away from said printing roll, one of said last-named means being of sufficient force to overcome the other, mechanism to render such means inactive, a motor drive unit to rotate said rolls and including a speed change device, an operating member for said speed changing device, and a connection between said member and the mechanism operative on the pressure rolls.

10. A decorating mechanism of the class described, including a printing roll and a pressure roll, adapted to retain work in contact with the printing roll, means to move the pressure roll toward the printing roll, means to move the pressure roll away from the printing roll, a motor, a driving connection between the motor and one of said rolls to rotate the rolls, a speed changing device coacting with the motor to selectively vary the speed of the rolls, an operating member for said speed changing device, and means interconnecting one of said pressure roll moving means to render the same operable or inoperable dependent upon the position of said operating member.

11. A decorating mechanism of the class described, including a pattern roll, an offset roll, a pressure roll arranged to retain work in contact with the offset roll, means to supply pigment to the pattern roll, means to move the pressure roll into and out of contact with the work, a motor, a driving connection between the motor and one of said rolls, said driving connection including a speed changing device, a manually operable member to selectively control the speed changing device, and a connection between said member and said moving means whereby the position of the pressure roll is determined by the position of the said member.

12. A decorating mechanism of the class described, including a printing roll, a pressure roll mounted for movement toward and away from the printing roll, a weight connected to move the pressure roll toward the printing roll, a second weight connected to move the pressure roll away from the printing roll, the first named weight acting with greater force than the last named weight whereby when the two weights act together the pressure roll is moved towards the printing roll, means normally acting to restrain the action of the first-named weight, whereby the pressure roll is normally moved away from the printing roll, a motor, a driving connection between the motor and said rolls, said driving connection including a speed changing device, and a common operating member for the speed changing device and the weight restraining means.

13. An apparatus of the class described, including a pattern roll, an offset roll, a pressure roll, means to supply pigment to the pattern roll, said pressure roll being movable toward and away from the offset roll, a driving mechanism to rotate said rolls, said driving mechanism including a selectively operable speed changing device, and a common operating member to move the pressure roll and operate speed changing device.

LLOYD V. CASTO.